Figure 1:
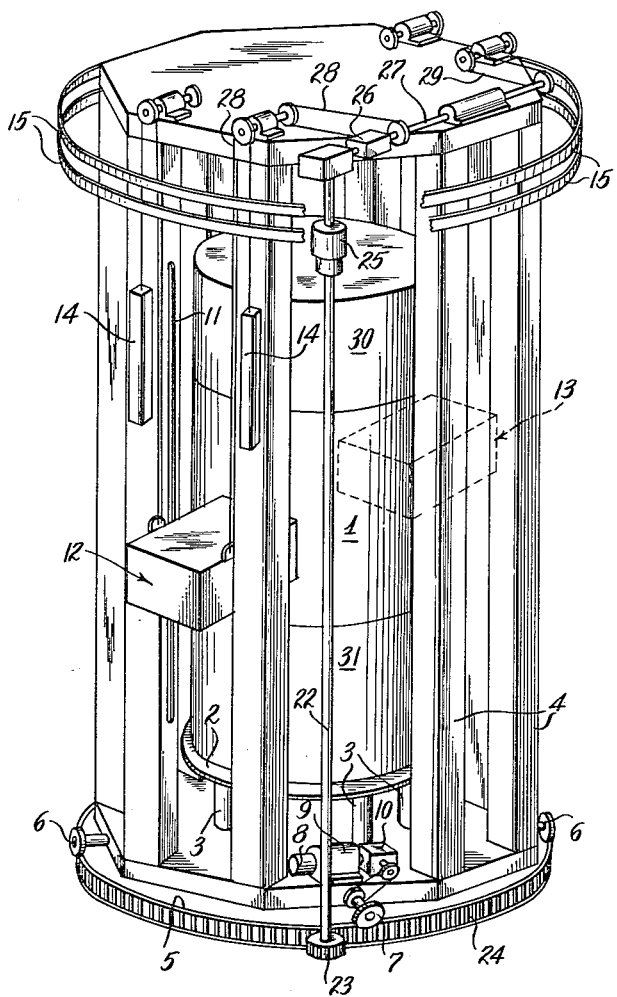

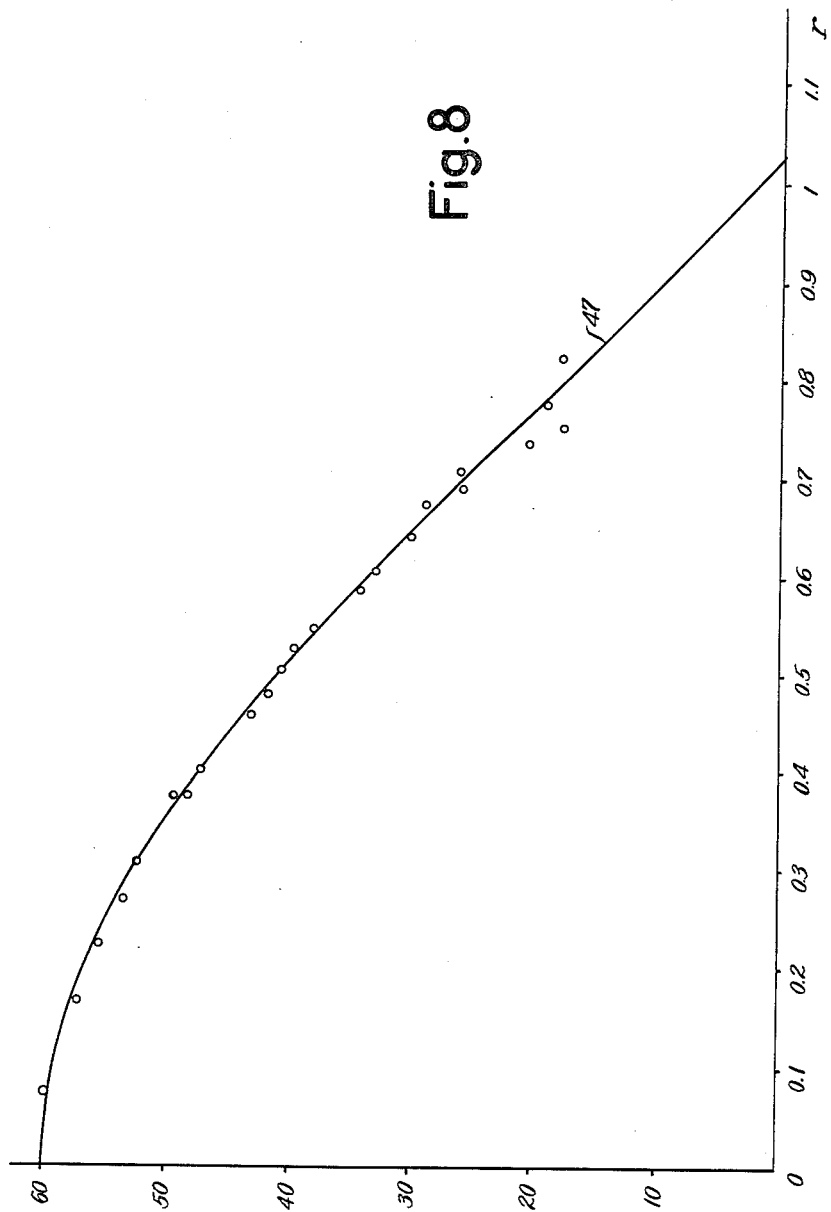

United States Patent Office 3,042,803
Patented July 3, 1962

3,042,803
METHOD AND APPARATUS FOR THE INVESTIGATION OF NEUTRON PROPAGATING MEDIA
Julien Martelly, Paris, France, assignor to Etablissement Public: Commissariat a l'Energie Atomique, Paris, France
Filed Aug. 4, 1958, Ser. No. 752,925
9 Claims. (Cl. 250—83.1)

This invention relates to experimental methods of and apparatus for investigation for determining the neutron propagating characteristis of various media, and related problems.

The neutronic characteristics of a medium, such as the diffusion length of an absorbing medium or the Laplacian of a reproducing medium, were heretofore generally determined by experiments of exponential character; that is, the spacial distribution of neutrons maintained in the medium under investigation followed an exponential law, or a sum of exponentials.

The experimental procedure of such tests is well known since the work of Fermi in 1942 (published in the Smyth Report), and more recently the work of Davenfort (Geneva Conference Report No. P/559, 1955), Cohen (Geneva Conference Report No. P/605, 1955) Kouts (Geneva Conference Report No. P/600, 1955) and Groshev (Proceedings of the Moscow Academy of Sciences, July 1955 Session).

Methods of this kind essentially involve irradiating one side of the medium to be investigated from a stationary exterior source of neutrons. There is produced in the medium a stable state characterized by a well-determined neutron distribution $\phi$. Assuming as a first approximation that the medium under test is isotropic, the Laplacian operator $B^2$ or "buckling" operator can then be derived from the neutron-diffusion equation, which at points remote from the outer surface of the medium and from the neutron source can be written as:

$$\nabla^2\phi + B^2\phi = 0$$

where $$\nabla^2\phi = \frac{\delta^2\phi}{\delta x^2} + \frac{\delta^2\phi}{\delta y^2} + \frac{\delta^2\phi}{\delta z^2}$$

if the system is defined, for instance, in rectangular coordinates.

In practice the medium is usually not isotropic so that the operator $B^2$ is not a scalar but rather a tensor. In most cases, however, it is sufficient to consider a transverse or radial component $B^2\perp$ and a longitudinal component $B^2\|$, which constitute the two principal Laplacian operators of the medium.

It is then necessary to carry out two independent exponential experiments to determine one at least of these components, with each experiment—of index $i$—yielding a special result in the form of a linear combination $$x_i^2 = a_i B^2\perp + b_i B^2\|$$

The mean Laplacian, a quantity required inter alia in critical pile computations for reactor design purposes, can be derived therefrom but only by introduction of a correcting factor which is ill-defined and introduces a substantial error.

The term $x_i^2$ itself is obtained as a difference between two terms of similar sign capable of both assuming large values relative to their difference, thereby further increasing the margin of error. Moreover, one of those terms is connected with the extrapolated dimensions of the medium under test. These dimensions are frequently ill-defined and are difficult to determine experimentally with adequate precision.

It is an object of this invention to provide a new and improved method and apparatus for the investigation of neutron-propagating media, whereby a faster, more reliable and more precise determination of the neutron characteristics of such media, including especially the Laplacian operator and diffusion length, L, can be achieved.

The method of the invention essentially comprises artificially creating a predetermined neutron flux through a substantially closed surface area surrounding a sample of the medium under investigation, controlling said neutron flux to establish predetermined boundary conditions for the flux through a second closed surface positioned interiorly of the first surface and to define an accurate boundary for an investigated portion of the medium, and measuring the neutron flux present within said portion.

Apparatus for carrying out the method essentially comprises, one or more neutron sources generating a neutron flux through a substantially closed surface surrounding the tested medium provided in the form of a sample having a well-determined geometrical structure, means for controlling the flux from said sources, and detecting means positioned within said sample and operable to plot a chart of the neutron distribution throughout the sample.

Any suitable neutron sources may be used, continuous or discontinuous in character, stationary or movable, and they may or not be provided with suitable reflecting and diffusing means. The important points are that the sources be distributed over a geometrically well-defined closed surface surrounding the block of matter comprising the medium under investigation, and that the source distribution throughout the tested medium will substantially approximate in effect that of a continuous distribution of sources over the surface under consideration. These conditions may be achieved in various ways:

One way is to use a source distribution that actually is continuous, e.g. in the form of a homogeneous neutron-emitting composition uniformly spread over a closed surface surrounding the medium.

Alternatively, discontinuous sources may be used concentrated at predetermined points or along predetermined straight lines or curves contained on the closed surface. Thus, in the case of a sample of the medium in the form of a solid of revolution, such a sample may be irradiated by means of sources distributed within toroids disposed along parallels of the surface of the solid.

Yet another way of achieving the desired result is to use localized or concentrated sources that are movable with respect to the sample, and displacing the sources over one or more curves surrounding the sample, in a generally cyclic movement. Where the detector means used are induced-radioactivity indicators, the cycle period of such movement should be selected short as compared to the period of the radioactive indicator used, and a large number of cycles may then be necessary. If on the other hand an instantaneous-response detector is used (such as a $BF_3$ chamber for instance) the duration of the cycle may be arbitrarily selected and a single cycle may suffice, since the acquired activity would then be totalized over the duration of the experiment.

Where the neutron source used is not displaceable, e.g. a thermal column of a reactor, a neutron generator, or the like, the source may be held stationary and the sample block displaced instead.

Any suitable type of neutron source may be used, including $(\alpha, n)$, $(\gamma, n)$, $(d, n)$ reactions, fission, etc.

Of the boundary conditions on a closed surface surrounding the medium, which conditions are selectable in the method of the invention, an important one is the neutron spectrum over the surface. Should the neutron sources used possess an inadequate spectrum, they may be associated with neutron converters, in the form of assemblies of diffusing, and possibly multiplying, media, and appropriately distributed so as to convert the primary neutrons from the sources into secondary neutrons having the desired spectrum distribution.

All types of media are open to investigation by the method of the invention, including absorbing and multiplying media, homogeneous and heterogeneous media, in liquid, solid, gas or composite state. Apparatus according to the invention will be especially valuable in the investigation of nuclear reactor pile lattices with samples that may be considerably smaller in mass than the critical value.

Any of a wide variety of geometric shapes may be adopted for the sample of medium under test, e.g. cylinders, spheres, polyhedra, etc. Advantageously the structure used is or approximates a simple geometrical form having a high degree of symmetry, in order to simplify the mathematical expression of the boundary conditions and the eigen-solutions of the diffusion equation. In this respect, cylindrical and spherical type geometries are found most convenient in carrying out the invention.

One simple and important case is where the sources are so distributed that the investigated flux (or its average over time) when expressed in suitable units, depends only on one space coordinate and on the magnitude being tested.

The detector probes used, positioned at different spaced points within the block of material, may be $BF_3$ or $B_4C$ chambers or induced-radioactivity detectors comprising small elements of a substance capable by neutron capture of generating radioactive isotopes, such as Mn, In, Cu, Ag, or the like, or they may be fission chambers or photographic plates.

One especially interesting and useful application of the invention is to the determination of the main Laplacians of a reproducing medium (such as a nuclear reactor pile lattice for example), by irradiation of a cylindrical sample of the medium so as to create therein a flux that will be independent of the $z$ dimension measured parallel to the cylinder axis. If the sample is one that includes a privileged direction and if this direction be selected parallel to the axis of the cylinder, the radial Laplacian $B^2\bot$ will be determined by identifying the experimentally observed radial distribution in a plane $z$=constant, expressed in suitable units, with a Bessel function $J_0(B\bot r)$.

It should be understood however that the invention is not limited to the determination of a Laplacian, since it can serve to yield valuable information on various physical characteristics of neutron-propagating media.

Thus, if an experiment similar to that described is carried out in an absorbent medium, its radial diffusion length $L\bot$ can be determined by identifying the neutron flux with a Bessel function $$I_0\left(\frac{r}{L\bot}\right)$$

In this instance, the test sample or block should be irradiated from sources of thermal neutrons. One satisfactory procedure is to determine by differential measurement between two experiments the flux of "negative" neutrons emitted by a cylindrical layer of absorbing composition, e.g. cadmium.

Moreover, a further cylindrical layer of absorbing material, e.g. boron, may be disposed within the tested medium. The number of neutrons absorbed in the boron can be inferred from its effective section area. When this is compared with the flux gradient near the absorbent material, the neutron diffusion coefficient in the medium can be derived. Variation of the gradient in a direction away from the boron further makes it possible to determine the macroscopic effective absorbing section of the medium.

By irradiating a diffusing medium of spherical form from a plurality of discrete sources distributed to approximate a uniform distribution over a sphere bounding the medium, and with due allowance where necessary for any corrective terms corresponding to high-rank spherical harmonics, apparatus according to the invention can be used to determine the diffusion length in media sufficiently absorbent to have a diffusion length on the order of 10 to 20 cm.

By irradiating a reproducing or absorbing medium of cylindrical form having an extrapolated height dimension $h$, from an extensive source positioned at $z$, so as to provide on the lateral surface of the cylinder a flux describable by a function of the form $$\cos\frac{\pi z}{h} \left(\text{or a sum of harmonic terms in } \cos\frac{n\pi z}{h}\right)$$

there is provided within the cylinder a flux of the form $$\cos\frac{\pi z}{h}I_0(\alpha r) \left(\text{or as the case may be a sum of terms in } \cos\frac{n\pi z}{h}I_0(\alpha_n r)\right)$$

The degree of anisotropy of the medium can then easily be determined by a conventional test.

By irradiating one or a small number of pile cells, or a core or fragment of a core of a pile, of either the thermal or fast neutron types, and by simulating the absent portion of the pile with apparatus according to the invention, it becomes possible to test the reproducing medium, measure the fine structure of the neutron flux in the cell or core, and obtain an experimental measurement of such magnitudes as the thermal utilization factor $f$, resonance escape probability factor $p$, etc.

Figure 2:
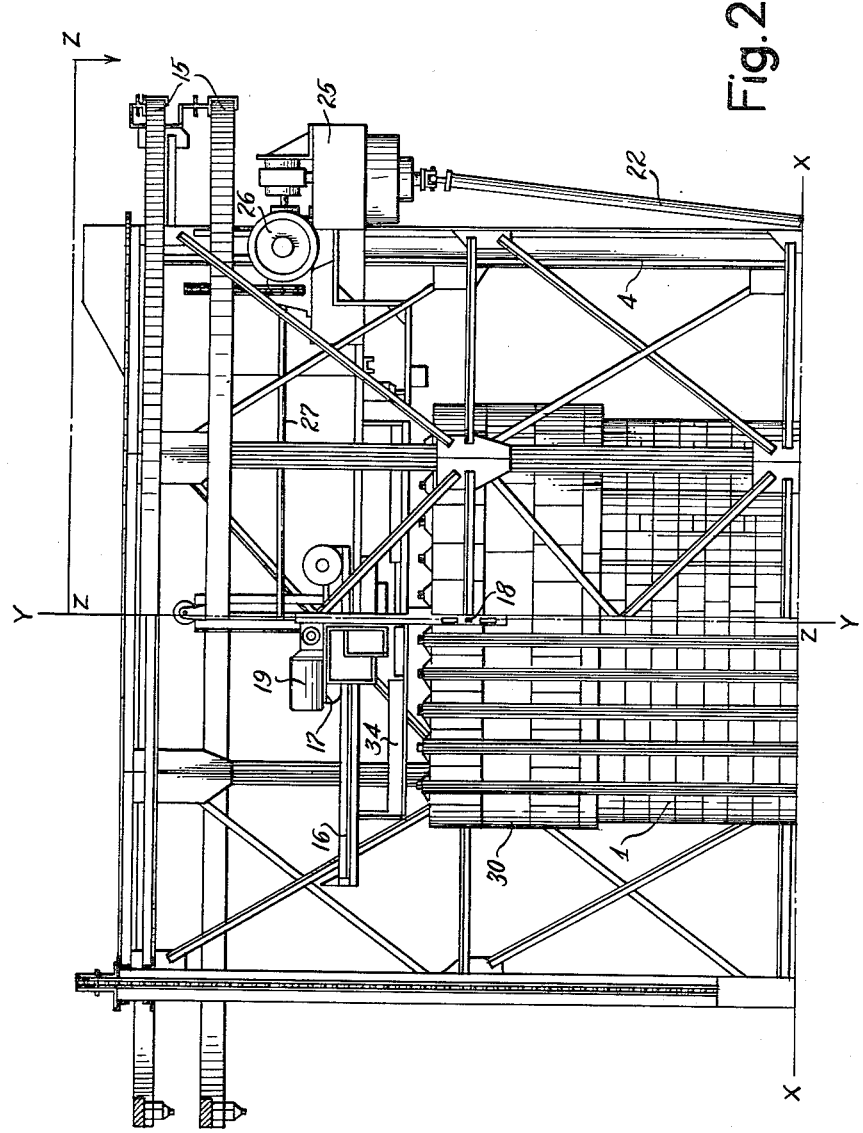
Figure 3:
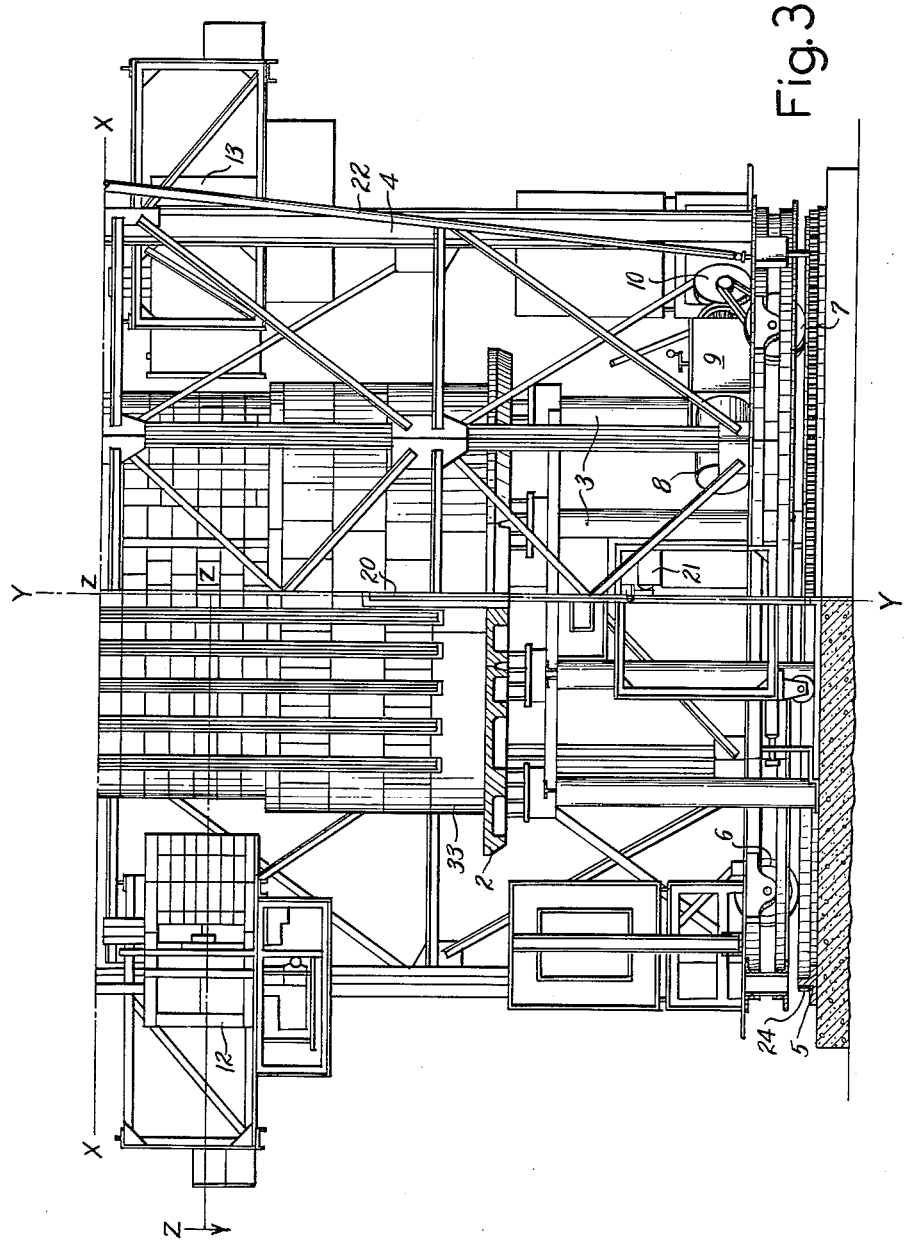
Figure 4:
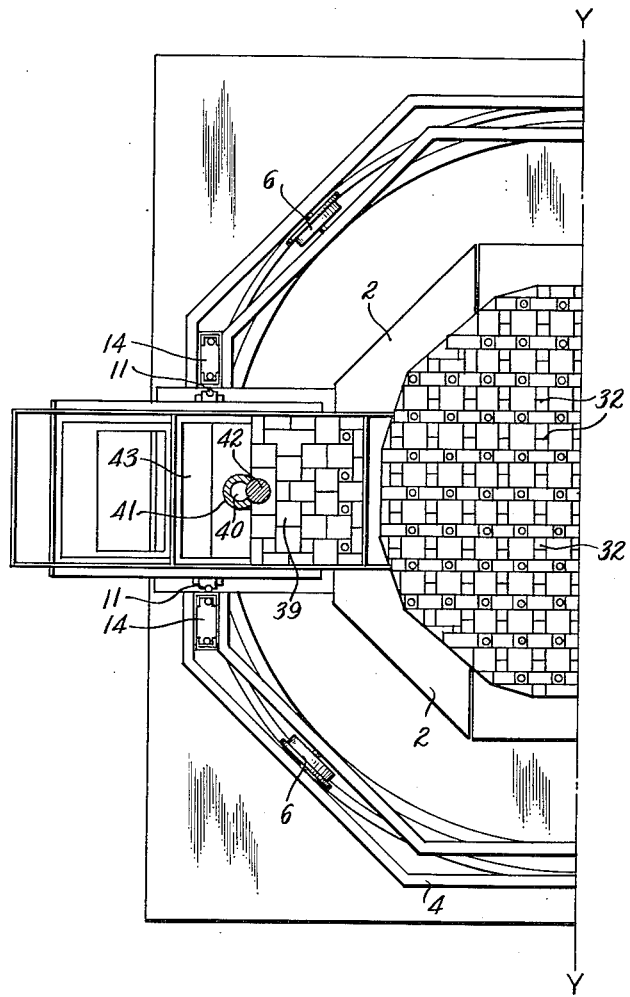
Figure 5:
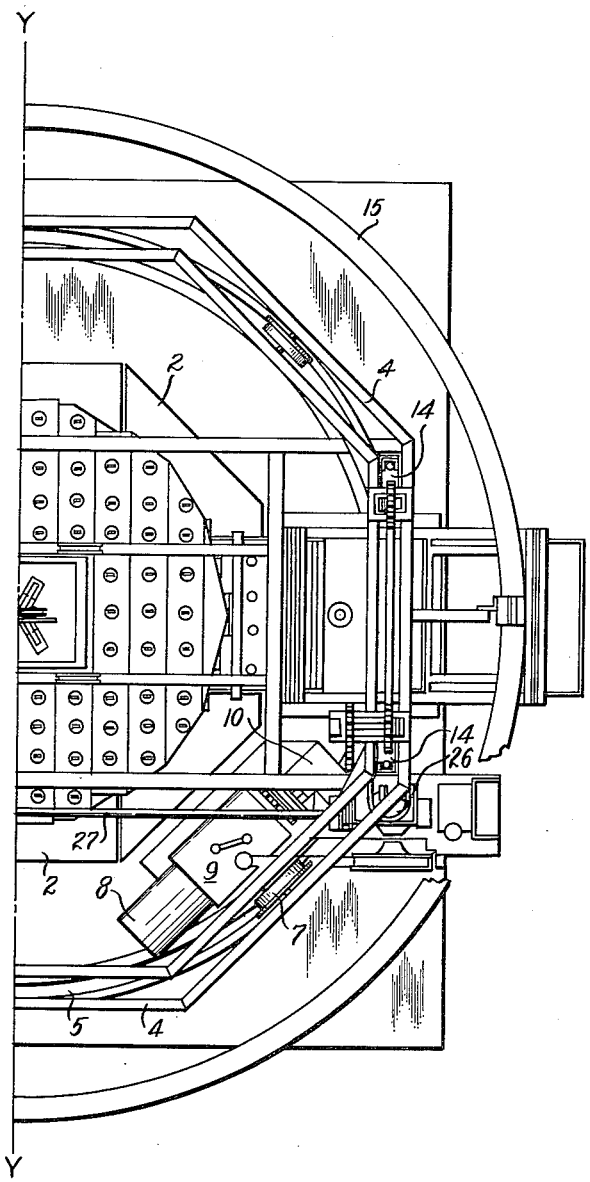
Figure 6:
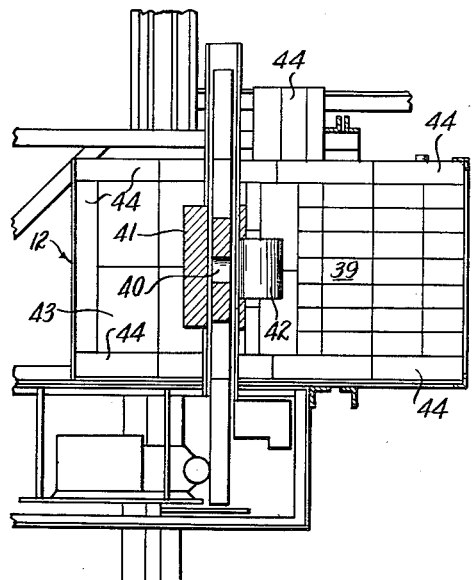
Figure 7:
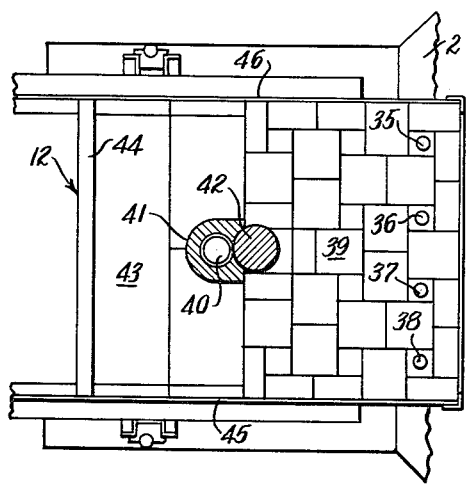

An exemplary embodiment of the invention will now be described for purposes of illustration but not of limitation with reference to the accompanying drawings, wherein:

FIG. 1 is a diagrammatic showing illustrating the mechanical operation of apparatus according to the invention; FIG. 2 and FIG. 3, when joined along the horizontal line XX, illustrate the apparatus in detailed elevation partly in section;

FIGS. 4 and 5 when joined on the vertical line YY, illustrate the same apparatus partly in section the view being taken on the staggered line, ZZ of FIGS. 2 and 3;

FIGS. 6 and 7 illustrate in detail one of the source units used, respectively in sectional elevation and plan; and FIG. 8 shows an experimental graph plotted by means of the illustrated apparatus, and demonstrates the radial distribution of the flux in a reproducing medium of cylindrical form.

The figures are largely schematical and illustrate only those components required in comprehending the invention, and corresponding parts have been given the same reference numerals throughout the views.

In the exemplary embodiment shown, the medium investigated is assumed to be an uranium-and-glucinium oxide lattice, in the form of a straight cylinder or prism of substantially circular base. In such a medium, there is established according to the invention a flux independent of the $z$ coordinate along the vertical axis of the cylinder, such a flux being similar to the type of flux obtaining in a cylindrical critical reactor pile of infinite length.

For this purpose, according to the invention, the sample cylinder is irradiated from a constant neutron source of appropriate spectrum similar to that of the neutron flux in a pile, which is made to describe cyclically and at constant velocity a helix coaxial with the test cylinder, the pitch of the helix being made small as compared to the diameter of the cylinder.

In practice, since the height scanned and the diameter are of similar orders of magnitude, losses are present due to "end flux effect" and these are compensated for as follows:

First, the surface density of the lateral source is increased adjacent to the ends of the cylinder: as the source reaches its endmost position near an end of the stack, its vertical movement is arrested for a predetermined number of revolutions before being reversed. For this purpose, the source units are supported on a device slidable and rotatable about the vertical axis of the test cylinder and operated to impart to the sources a uniform circular displacement with up and down reciprocations and intermediate stationary periods.

Moreover, small auxiliary sources are disposed axially of the cylinder near its end faces and exteriorly of the test block. These auxiliary sources may be permanent or temporarily active.

Referring now to FIGS. 1 to 5, there is illustrated at 1 a stack supported on a flat table 2 mounted on uprights 3. Arranged around the stack 1 is a tower-like metal framework (e.g. of octagonal cross section in plan) supported on a circumferential rail or track 5 by means of e.g. four wheels, such as the two wheels 6 and 7 shown in FIG. 1, provided with suitable means for centering the framework. One of the wheels, the wheel 7 in FIGS. 1 and 3, is driven from an electric motor 8 through a variable-gear drive 9 and a reducer 10. The motor 8 is provided with an ample power rating (e.g. 3 H.P. in the construction here described) in order to ensure that the rotational velocity of the tower 4 about the stack 1 will be highly stable. The variable gear 9 permits adjusting this velocity within a range of from 2 to 10 r.p.m.

Secured to two diametrically opposed sides of the octagonal tower 4 are longitudinal pairs of guideways 11 along which two source blocks 12 and 13, respectively, are slidable. The blocks 12 and 13 are connected to chain and sprocket actuating means and are balanced thereon by means of counterweights such as 14.

Surrounding the top of tower 4 is a circumferential electric power rail 15. Across the top of the tower is a platform structure 16 (FIG. 2) whereby access may be had to the vertical ducts into which the detector probes are inserted. The platform further supports a control desk, not shown, and a carriage 17 (see FIG. 2) on which is mounted an axial source 18 positioned by means of a motor 19 and serving to compensate for end flux effects. A further axial source 20 positionable by means of a motor 21 and supported on a carriage movable over the floor surface, is provided under the table 2 as shown in FIG. 3.

A vertical shaft 22 (FIG. 1) journalled in the framework of tower 4, carries at its lower end a gear 23 which meshes with a circumferential gear annulus or rack 24 closely surrounding the circumferential track 5 and stationary with respect to the floor. Rotation is transmitted from the upper end of the shaft 22 by way of a coupling and reversing device 25 and a torque limiter 26 to a horizontal shaft 27 journalled across the top of the tower. sprocket gears carried on the shaft 27 and connected by way of sprocket chains 28 and 29 to the sprocket gears supporting the chains from which the source blocks 12 and 13 are suspended, serve to impart vertical reciprocatory movement to said blocks. The vertical movement of the sources is thus positively synchronized with the rotation of the tower 4 about the stack 1 and precludes any substantial variation in the pitch of the helix described by each source around the test stack.

The source blocks 12 and 13 are arrested and their motion is reversed at the ends of their vertical reciprocatory path, this operation being derived from the rotation of the tower in such a manner that each stage of movement of the sources will last a predetermined, adjustable, number of quarter-revolutions of the tower. Presentation of the sources controls the initiation of the first cycle. The rotation of the tower is arrested and the sources are withdrawn automatically on completion of a selected number of cycles. All these results can readily be achieved by any suitable conventional automatic control means, e.g. cam or the like, and hence have not been illustrated herein.

The test stack 1 is a cylinder of pseudo-circular cross section 0.819 meter in average radius, including extrapolation distance, and 2.760 m. in height. The glucinium oxide GlO occupies therein a height of only 1.400 meters, representing a mass of 8 tons. The cylinder is disposed between a pair of guard sections 30 and 31 comprising graphite-hydrogen-uranium lattice, the hydrogen being introduced into the lattice in the form of polyethylene tubes to equalize the retarding capacities of both media and thus avert spectrum disturbances at the boundary surface between them.

The square-mesh lattice has a lattice spacing of 150 mm. The channels containing the bars are 50 x 50 mm.$^2$ in section. The uranium bars have a diameter of 29.2 mm. and are contained in aluminium tubes 30 x 32 mm. in section. The stack contains 90 bars of uranium and as many test channels, arranged at selected points 32 at which the microscopic flux is a maximum within the stack (FIG. 4).

Extending the reflective medium at its lower end is a graphite reflector 33 (FIG. 3) 0.20 m. in thickness, and extending it at its upper end is a paraffin reflector 34 (FIG. 2) having the same albedo value the albedo being the ratio of the neutron current density out of a medium to the neutron current density into it.

The vertical displacement of sources 12 and 13 is 2.50 m. in length, and is covered in a time corresponding to 12.25 revolutions of the tower 4. The stationary periods of the sources 12 and 13 at the upper and lowermost ends of the stack each correspond with 3 revolutions. Since a complete cycle represents one half an integral number of revolutions, both sources 12 and 13 exchange their positions every cycle, thereby ensuring perfect compensation for any minor inequalities between the sources. Each revolution of the tower 4 is performed in 30 seconds, in the example described. The full period or cycle of operation, comprising 30.5 revolutions, therefore takes about 15 minutes. The irradiation effects are integrated over time by the use of induced-radioactivity detectors which serve as the probes for measuring the neutron flux, and including Mn (2.576 hours) and In (54.0 minutes). The acquired radioactivity is the same as though all of the irradiation over a cycle had occurred at an intermediate instant of time. The second-order terms disregarded represent less than one per mil, in the case of the Mn detector, and 5 p.m. for the In detector. Recording means are provided whereby the regular progress of each operating cycle can be arcurately checked. Moreover, safety arrangements are used which act to arrest the rotation of the tower in specified cases of defective operation, such as incorrect presentation of the sources, excessive upward and downward travel of the sources beyond prescribed limits, and irregular duration of the cycles.

A source block is illustrated in detail in FIGS. 6 and 7. This block includes a converter consisting of a multiplier medium comprising glucinium-oxide and uranium similar to the medium provided in stack 1, and is made up of four cells 35, 36, 37 and 38 positioned on the front face of a stack of glucinium oxide 39. Positioned on the rear face of the stack 39 is the actual neutron source 40 which is of the radium-alpha glucinium type comprising six sources 0.5 curie each. The source 40 is surrounded by a bismuth shield 41 for screening the $\gamma$ rays. A cylindrical block 42 of uranium positioned on the front face of the source 40 is adapted for further arresting $\gamma$ radiation, but serves primarily to retard the faster neutrons by inelastic impact.

Further provided in the source block assemblies of FIGS. 6 and 7 is a graphite block 43 positioned on the rear face and serving as a reflector, and a layer 44 of paraffin surrounding the graphite block 43. Two sheets of cadmium 45 and 46 line the side surfaces of the block for arresting thermal neutrons.

The graph of FIG. 8 shows a curve plotted by means of the apparatus described and illustrating as a function of radial distance $r$ from the axis, the flux as determined in a plane $z=$constant, in the U–GlO lattice investigated. The continuous curve 47 was plotted by the method of least squares to represent, with a suitable multiplier factor, the Bessel function $J_0(B\perp r)$ most nearly approximating the experimental points of the curve. This gives a measure of the desired radial Laplacian $B\perp$.

What I cliam is:

1. Apparatus for investigating the neutron-propagating characteristics of a medium, comprising means supporting a sample of said medium having a well-determined geometrical structure, one or more neutron sources generating a neutron flux through a substantially closed surface completely surrounding the sample, means for controlling the neutron emission of said sources, and means for directly measuring the resulting neutron flux received within a certain volume in the sample, said volume being bounded by a surface within said surrounding surface.

2. An apparatus for investigating the neutron-propagating characteristics of a medium, comprising means supporting a sample of said medium, at least one neutron source, means imparting relative displacement between said sample and source whereby said source describes a circuitous relative path of motion around said sample, means for controlling the neutron emission from said source, and means directly measuring, at spaced points within the sample, the resulting neutron flux received within the sample.

3. An apparatus for investigating the neutron-propagating characteristics of a medium, comprising means supporting a generally straight cylindrical sample of said medium, at least one neutron source, means imparting relative displacement between said sample and source whereby the source describes a helical path around the sample coaxially with the cylindrical surface thereof, means for controlling the neutron emission from said source, and means directly measuring, at spaced points within the sample, the resulting neutron flux received within the sample.

4. An apparatus for investigating the neutron-propagating characteristics of a medium, comprising means supporting a generally straight cylindrical sample of the medium, a generally prismatic frame surrounding the sample coaxially therewith and supported for rotation relative thereto, means for supporting neutron sources on said frame for longitudinal displacement relative to the frame, means for controlling the neutron emission from said sources, means for synchronously rotating said frame and longitudinally displacing the sources relative to the frame whereby said sources describe generally helical paths around the sample, and means directly measuring, at spaced points within the sample, the resulting neutron flux received within the sample.

5. An apparatus as claimed in claim 4, wherein said synchronous means are arranged to impart one full reciprocation to said sources from one end of the frame to the other end and back to said one end while said frame has been rotated by an integral number of semi-revolutions.

6. An apparatus as claimed in claim 5, wherein there are two sources in diametrically opposed relation around said frame and both sources are reciprocated in unison so as to be retained in mutually facing relation.

7. An apparatus as claimed in claim 4, wherein said synchronous means are arranged to impart to a relatively slow rate of longitudinal traverse to said sources as compared to the angular rate of frame rotation whereby said helix has a short pitch as compared to its diameter.

8. In an apparatus as claimed in claim 4, additional neutron sources adjacent the opposite ends of the cylindrical sample and means for controlling the neutron emission from said additional sources to compensate for end flux effects.

9. In an apparatus as claimed in claim 4, means for arresting the longitudinal displacement of the sources during a period of time as said sources reach the endmost positions of said longitudinal displacement to compensate for end flux effects.

References Cited in the file of this patent

UNITED STATES PATENTS

| | | |
|---|---|---|
| 2,517,469 | Dodson | Aug. 1, 1950 |
| 2,713,125 | Gesiler et al. | July 12, 1955 |
| 2,719,823 | Zinn | Oct. 4, 1955 |
| 2,751,505 | Anderson | June 19, 1956 |
| 2,781,307 | Wigner | Feb. 12, 1957 |
| 2,798,847 | Fermi et al. | July 9, 1957 |
| 2,828,875 | Ginns | Apr. 1, 1958 |